Patented Apr. 28, 1942

2,281,253

UNITED STATES PATENT OFFICE 2,281,253

NITRO ALCOHOL

Alfred G. Susie, Boston, Mass., assignor to Purdue Research Foundation, La Fayette, Ind., a corporation of Indiana No Drawing. Application March 5 1941, Serial No. 381,845

1 Claim. (Cl. 260—617)

My invention relates to a new and useful cycloalkyl substituted aliphatic nitro alcohol. More particularly, it relates to 1-(1-nitrocyclohexyl)-1-ethanol having the following structural formula:

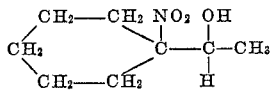

This nitro alcohol may suitably be prepared by any of the previously known methods for effecting the condensation of an aliphatic aldehyde with a nitroalkane, such as nitrocyclohexane. However, I prefer to prepare this nitro alcohol by slowly adding, with thorough agitation, a slight molecular excess of acetaldehyde to nitrocyclohexane in the presence of a small amount of a basic catalyst, such as sodium hydroxide. During the addition of the acetaldehyde the reaction vessel is preferably placed in an ice bath and kept at a temperature below 30° C. When the acetaldehyde has been added, the resulting mixture is allowed to stand for approximately 12 hours, after which the basic catalyst is neutralized with an equivalent of concentrated hydrochloric acid. The sodium chloride thus formed may be filtered off and the nitro alcohol obtained by fractionating the filtrate under vacuum.

The nitrocyclohexane employed in the preparation of this nitro alcohol may be prepared in accordance with any suitable procedure, for example, it may be satisfactorily produced by reacting cyclohexane with nitric acid in the vapor phase in a glass reaction chamber at a temperature of 420° C., and recovering the nitrated cyclohexane in a known manner.

The preparation of the nitro alcohol of my invention may be further illustrated by the following specific example:

Example

To a mixture containing 129 parts of nitrocyclohexane and 5 parts of 5 N sodium hydroxide solution, there was added dropwise, with thorough agitation, 48 parts of acetaldehyde. The reaction mixture was immersed in an ice bath and the temperature maintained below 30° C. When addition of acetaldehyde was complete, the resulting mixture was allowed to stand for a period of 12 hours, after which the sodium hydroxide present was neutralized by the addition of the calculated quantity of concentrated hydrochloric acid. The precipitated sodium chloride was filtered off and the filtrate fractionated under vacuum. The 1-(1-nitrocyclohexyl)-1-ethanol obtained in this manner boiled at 128.5° C. (10 mm.), and was a very viscous liquid possessing a slight amber color.

The nitro alcohol produced in accordance with the procedure described above is useful as an intermediate in the preparation of numerous organic compounds. Other valuable uses of this nitro alcohol will be apparent to those skilled in the art.

My invention now having been described, what I claim is:

1-(1-nitrocyclohexyl)-1-ethanol.

ALFRED G. SUSIE.